(12) United States Patent
Chen et al.

(10) Patent No.: US 11,174,428 B2
(45) Date of Patent: Nov. 16, 2021

(54) NANOPHOSPHORS FOR VISIBLE LIGHT ENHANCEMENT

(71) Applicant: BOARD OF REGENTS, THE UNIVERSITY OF TEXAS SYSTEM, Austin, TX (US)

(72) Inventors: Wei Chen, Arlington, TX (US); Lun Ma, Arlington, TX (US)

(73) Assignee: THE BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 486 days.

(21) Appl. No.: 16/069,086

(22) PCT Filed: Jan. 12, 2017

(86) PCT No.: PCT/US2017/013210
§ 371 (c)(1),
(2) Date: Jul. 10, 2018

(87) PCT Pub. No.: WO2017/123774
PCT Pub. Date: Jul. 20, 2017

(65) Prior Publication Data
US 2019/0031953 A1 Jan. 31, 2019

Related U.S. Application Data

(60) Provisional application No. 62/277,781, filed on Jan. 12, 2016.

(51) Int. Cl.
*C09K 11/08* (2006.01)
*C01B 32/05* (2017.01)
*C09K 11/58* (2006.01)
*C09K 11/56* (2006.01)
*C09K 11/57* (2006.01)
*B82Y 30/00* (2011.01)
*B82Y 40/00* (2011.01)
*B82Y 20/00* (2011.01)

(52) U.S. Cl.
CPC .......... *C09K 11/0883* (2013.01); *C01B 32/05* (2017.08); *C09K 11/565* (2013.01); *C09K 11/574* (2013.01); *C09K 11/584* (2013.01); *B82Y 20/00* (2013.01); *B82Y 30/00* (2013.01); *B82Y 40/00* (2013.01)

(58) Field of Classification Search
CPC . C09K 11/0083; C09K 11/573; C09K 11/584; C09K 11/565
See application file for complete search history.

(56) References Cited

U.S. PATENT DOCUMENTS

2013/0188333 A1* 7/2013 Ooya .................. F21V 9/30 362/84
2015/0036316 A1* 2/2015 Lin .................... F21V 29/773 362/84

* cited by examiner

*Primary Examiner* — C Melissa Koslow
(74) *Attorney, Agent, or Firm* — FisherBroyles LLP; Anthony J DoVale

(57) ABSTRACT

Disclosed herein are composite materials that comprise one or more nanophosphors capable of converting higher frequency, lower wavelength radiation into visible light. As used, the produced visible light enhances the amount of visible light already present from natural or artificial sources.

13 Claims, 13 Drawing Sheets

NANOPHOSPHORS FOR VISIBLE LIGHT ENHANCEMENT

FIELD OF THE DISCLOSURE

Disclosed herein are composite materials that comprise one or more nanophosphors capable of converting higher frequency, lower wavelength radiation into visible light. As used, the produced visible light enhances the amount of visible light already present from natural or artificial sources.

BACKGROUND

It is projected that the world population will be about 10 billion before reaching a plateau in the later part of this century, and increasing economic prosperity of the developing world is forecast to soon place even greater demands on agricultural production than will population growth. With very few prospects to sustainably expand the 1.5 billion ha of cropland currently under cultivation, a doubling of productivity will be needed to meet the increasing demand before the end of this century.[1, 2] In the last ten years, increases in yield for some major crops such as rice have shown little improvement.[3] In 2008, the world saw the lowest wheat stockpiles of the past 30 years and fears of a rice shortage incited riots in some countries.[4] Adding to this, the rapid growth in the Chinese and Indian economies has resulted in never before seen demands on grain supplies. [3] Increasing grain crop productivity is the foremost challenge facing agricultural research. Globally, rice is the world's most important crop in terms of the number of people who depend upon it as their major source of calories and nutrition. After rapid increases in yield over the latter half of the twentieth century, further yield increases appear harder to obtain. This indicates that human will be facing the crisis of food supplies in the near future and a boost in food production is urgently demanded.

The other challenge facing the world is an energy crisis. Our present oil reserves will last 40 years at most and will decline significantly well before then. Globally, experts are working hard to find out how renewable sources of energy can be used to better fulfill our energy needs. Today, when we talk about renewable energy sources we usually mean solar energy, wind power and water (hydroelectric or watermill) power. Renewable energy sources by their very nature will never be exhausted. The great thing about solar energy is that there is an unlimited supply and it is relatively easy and straightforward to implement. Solar energy doesn't pollute the environment and produces so much energy that the total amount of light and heat energy that hits the earth every hour is enough to meet the entire energy needs of the planet for a whole year. The use of nanophosphors to convert UV sunshine to blue and red light for photosynthesis improvement can provide a good solution not only for food need but also for other purposes that will help with the energy crisis.

Numerous efforts have been dedicated to the research and development of luminescence materials for these applications and most phosphors are rare earth based materials. For example, the three basic phosphors for solid-state lighting are materials doped with $Eu^{3+}$ (red), $Tb^{3+}$ (green) and $Eu^{2+}$ (blue). The most tested luminescence or light converting materials for photosynthesis improvement are $Eu^{2+}$ doped sulfates and silicate phosphors. The advantage is that these materials have a high light output that can meet the requirement for these applications. However, the challenging issue is that rare earths are very expensive and their resources are limited due to the extremely low abundance of these elements on earth.

There is, therefore, a long felt need for alternative solutions. One alternative is the use of non-rare earth materials that can fulfill these requirements of practical applications, an alternative that is inexpensive, practical, and provides near to equal or better results when compared to the rare earth phosphors.

The following drawings illustrate by way of example and not limitation. For the sake of brevity and clarity, every feature of a given structure is not always labeled in every figure in which that structure appears.

FIG. 1A depicts the emission and excitation spectra for the as-prepared $g-C_3N_4$, and nitric acid treated $g-C_3N_4$. Line a1 is for the untreated, while a2 has been treated with 34.4% nitric acid, a3 with 47.6% nitric acid, and a4 with 60.7% nitric acid.

Figure 6:
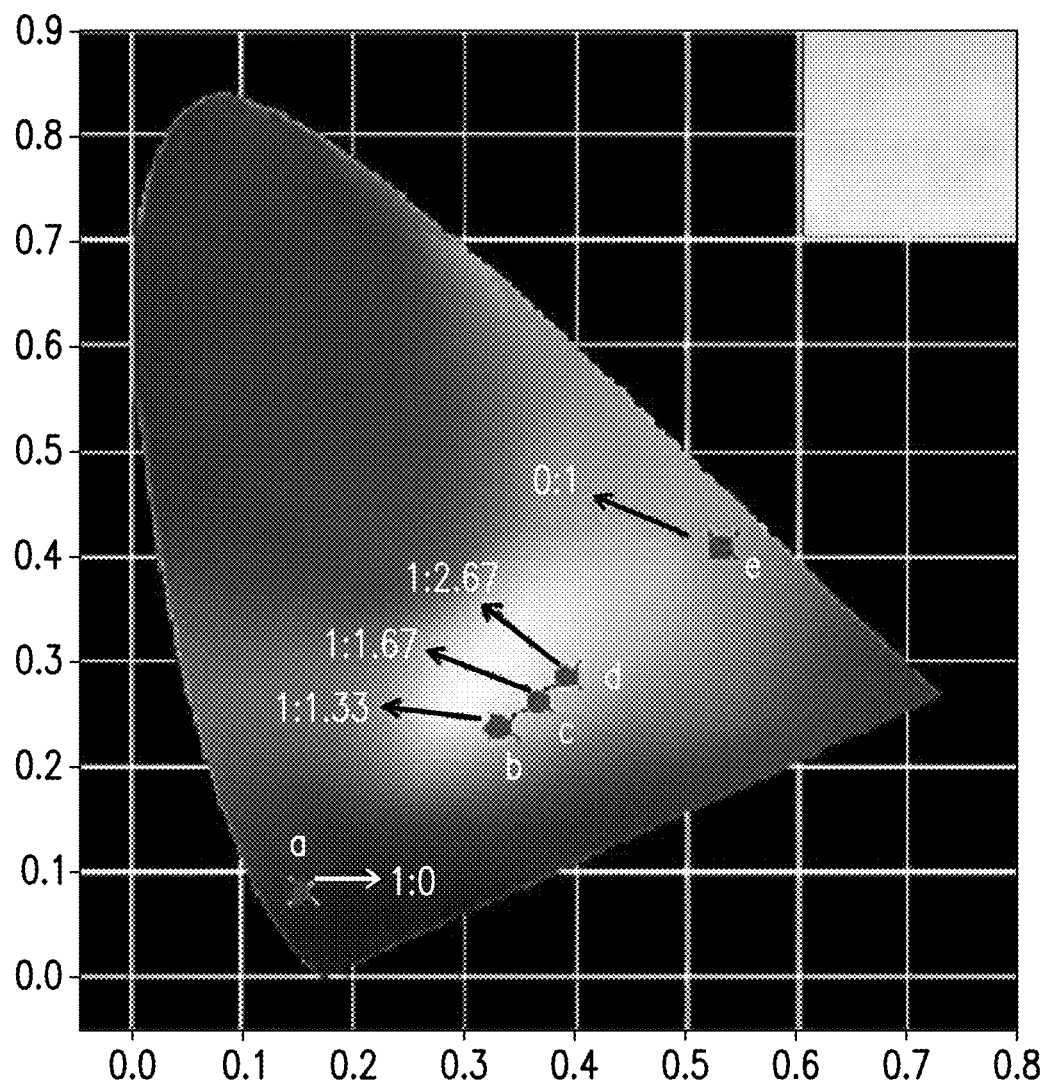

The inset in FIG. 6 shows a photo of the mixed nanophosphors excited by a 365 nm UV lamp.

Figure 7:
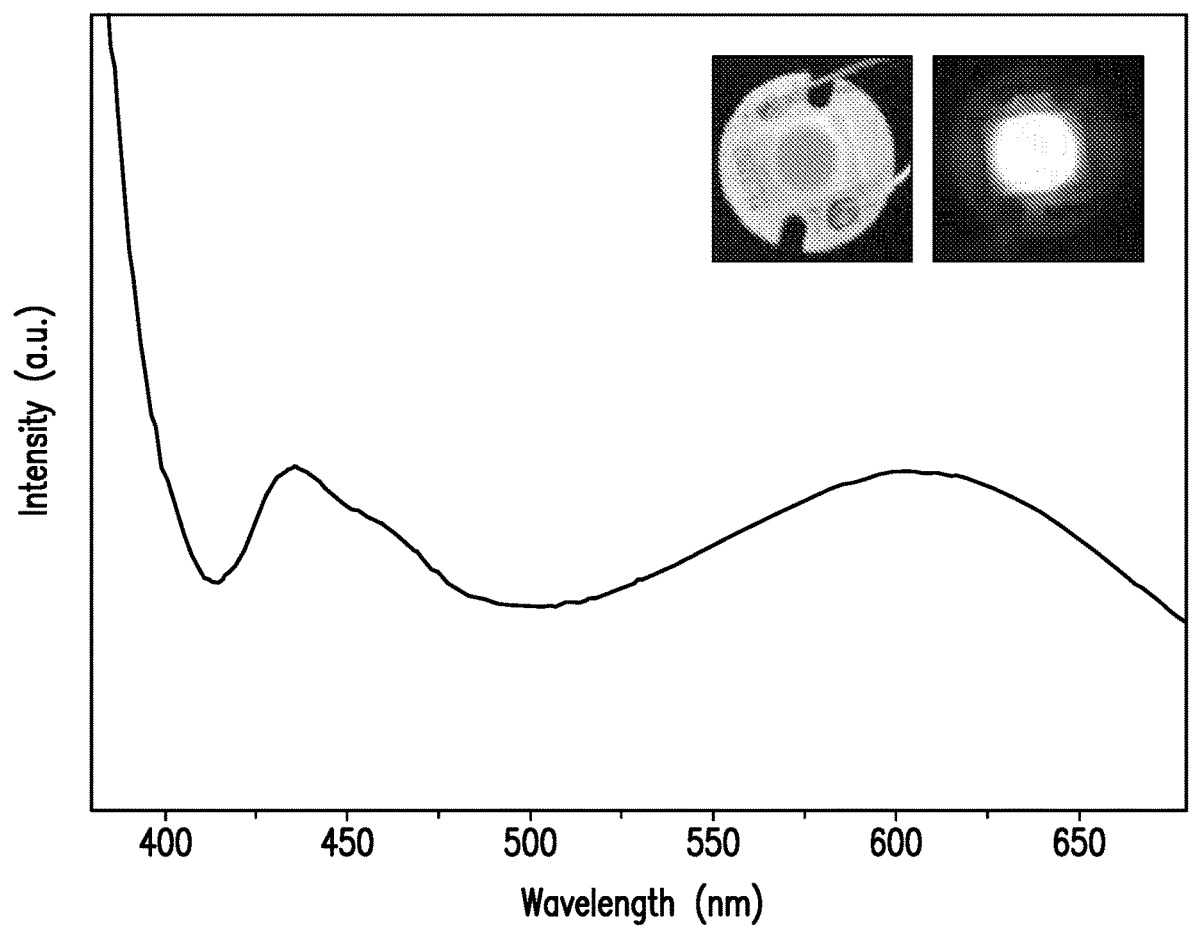

FIG. 7 shows a single-composition WLED lamp and the corresponding white-light emission driven under a forward bias current of 300 mA.

Figure 8A:
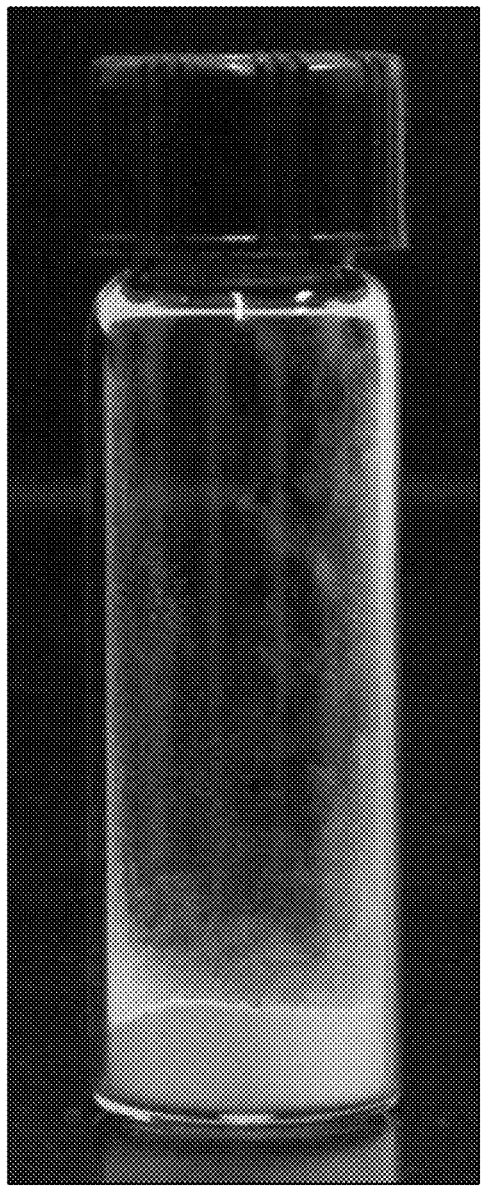

FIG. 8A shows Zn:Ag,Mn under white room light.

Figure 8B:
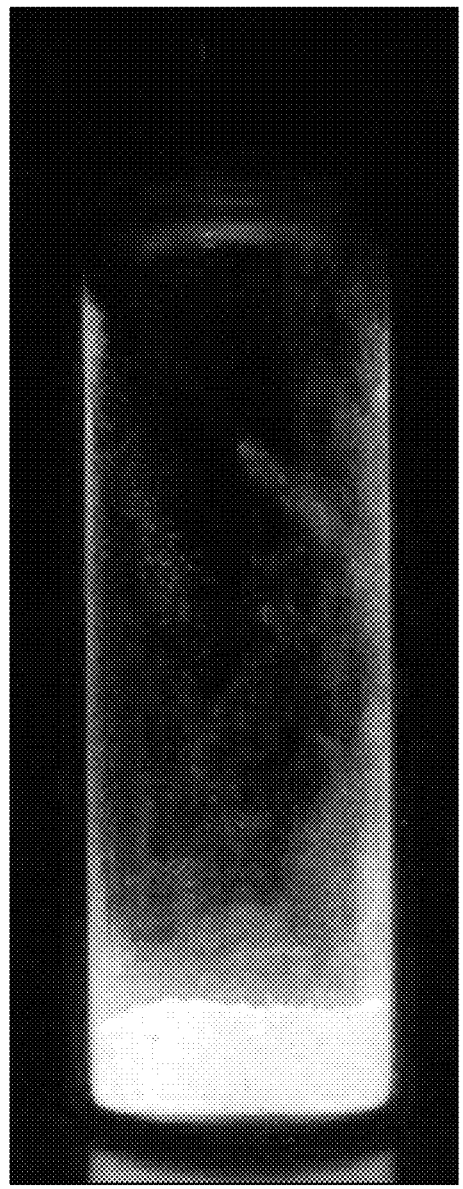

FIG. 8B shows Zn:Ag,Mn under a 360 nm UV lamp.

Figure 9:
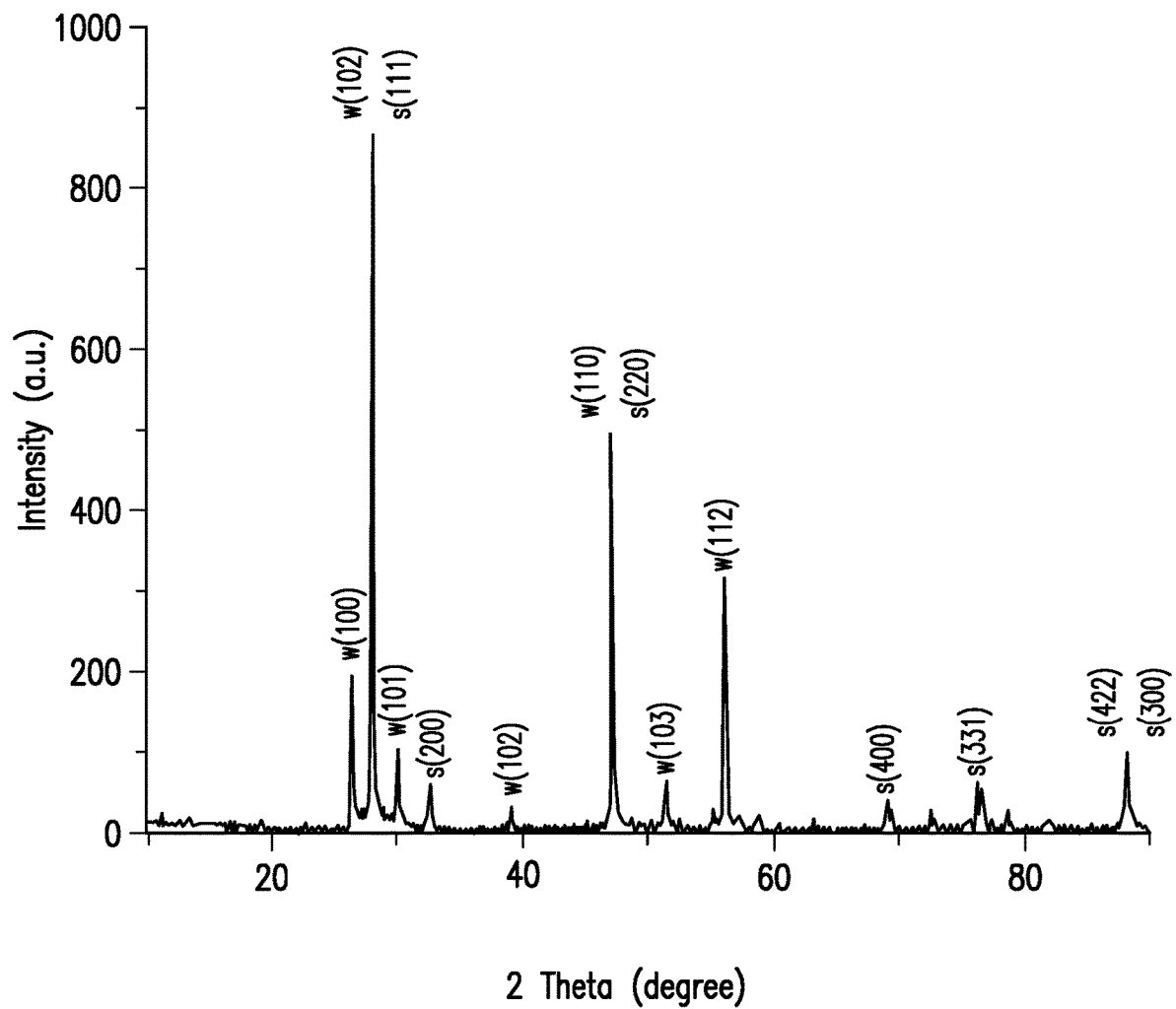

FIG. 9 depicts the XRD pattern of the ZnS:Ag,Mn powder, showing both sphalerite and wurtzite structure.

Figure 10A:
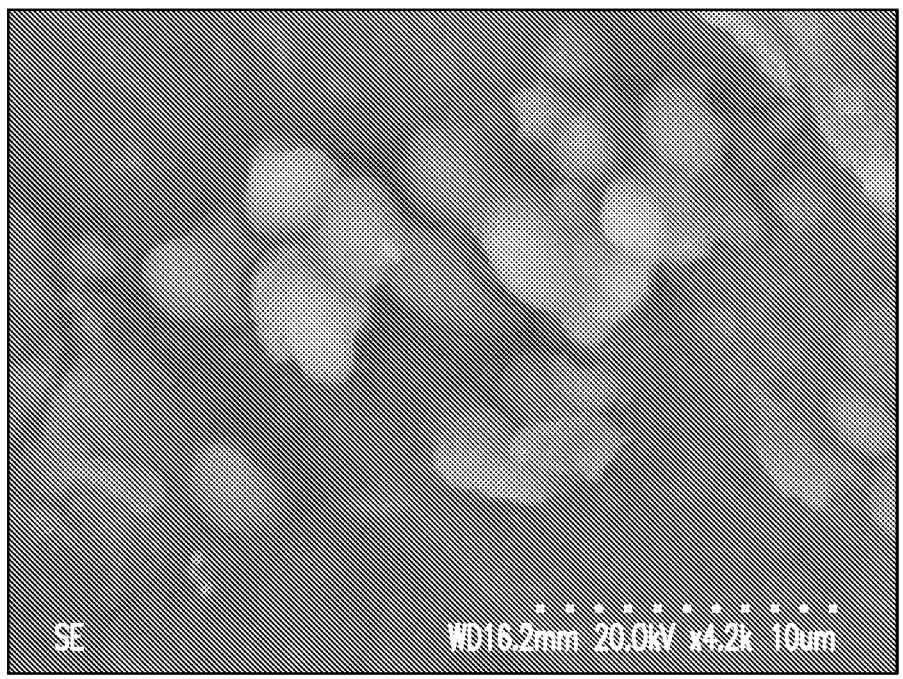
Figure 10B:
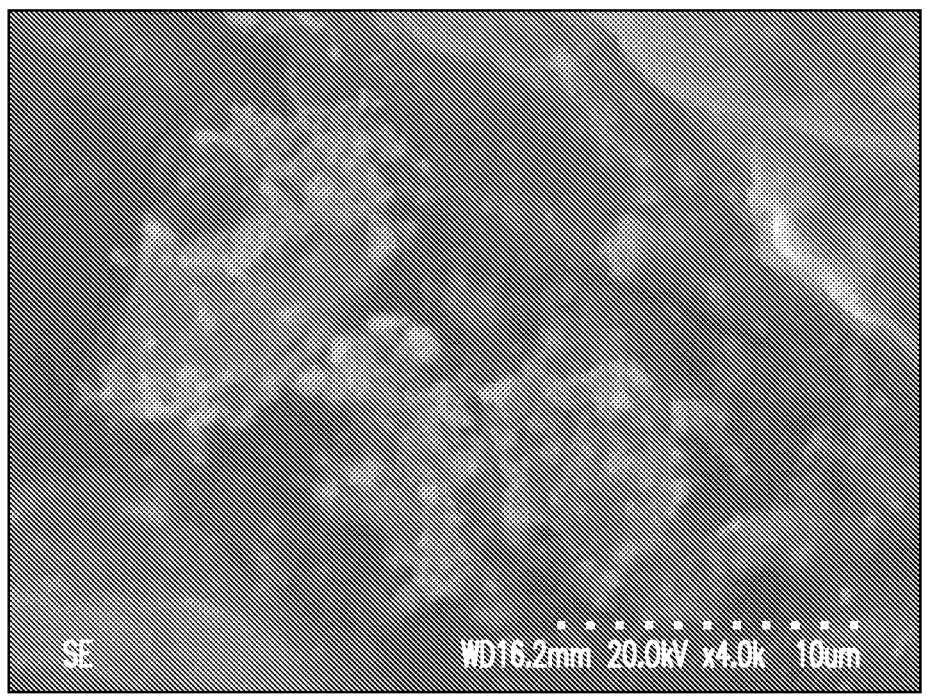

FIG. 10A and FIG. 10B show SEM images of ZnS:Ag,Mn which display the co-existence of large (~3 μm) on FIG. 11A and small (~100 nm) particles on FIG. 11B.

Figure 11:
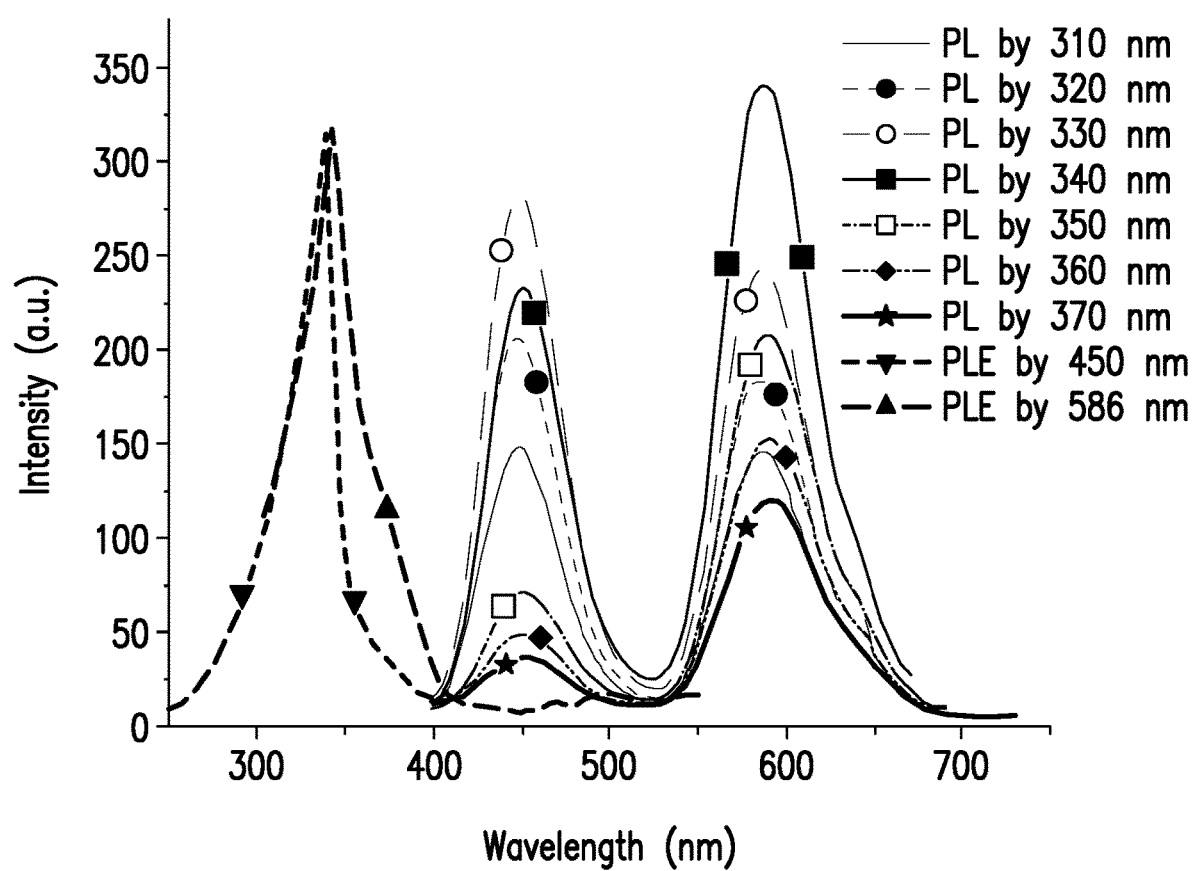

FIG. 11 depicts the emission (PL) and excitation (PLE) spectra of ZnS:Ag,Mn monitored by different wavelengths.

Figure 12:
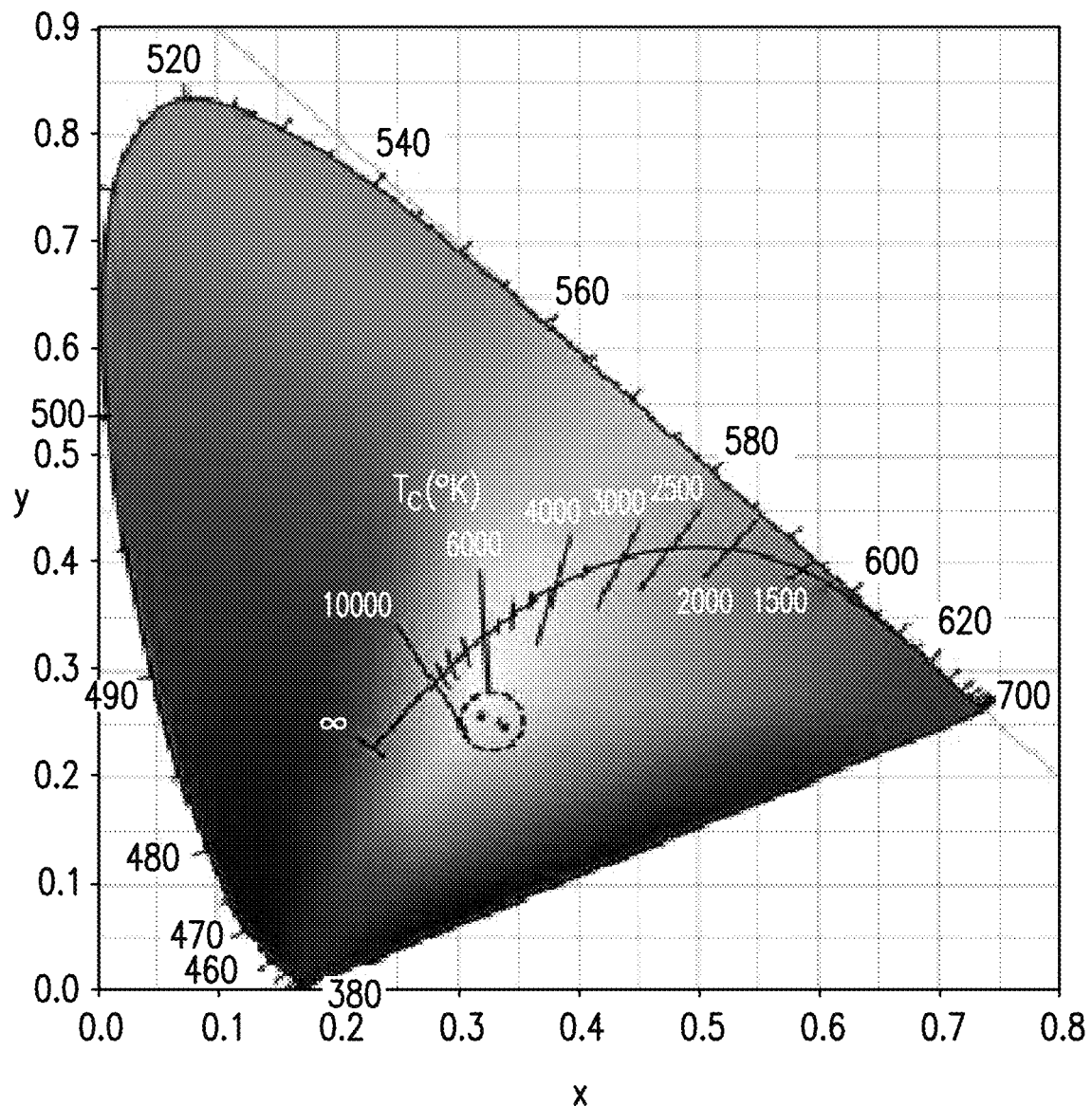

FIG. 12 depicts the CIE chromaticity coordinates of ZnS:Ag,Mn under different excitations (310, 320, and 330 nm) displayed as those black dots (circled by the dash line) that are located in white color region.

DETAILED DESCRIPTION

The materials, compounds, compositions, articles, and methods described herein may be understood more readily by reference to the following detailed description of specific aspects of the disclosed subject matter and the Examples included therein.

Before present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

All percentages, ratios and proportions herein are by weight, unless otherwise specified. All temperatures are in degrees Celsius (° C.) unless otherwise specified.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

The terms "a" and "an" are defined as one or more unless this disclosure explicitly requires otherwise. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Values expressed as "greater than" do not include the lower value. For example, when the "variable x" is defined as "greater than zero" expressed as "0<x" the value of x is any value, fractional or otherwise that is greater than zero. Similarly, values expressed as "less than" do not include the upper value. For example, when the "variable x" is defined as "less than 2" expressed as "x<2" the value of x is any value, fractional or otherwise that is less than 2.

"Optional" or "optionally" means that the subsequently described event or circumstance can or cannot occur, and that the description includes instances where the event or circumstance occurs and instances where it does not Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The feature or features of one embodiment may be applied to other embodiments, even though not described or illustrated, unless expressly prohibited by this disclosure or the nature of the embodiments.

As used herein, "electromagnetic radiation" refers to a form of energy containing both electric and magnetic wave components which includes ultraviolet (UV), visible and infrared (IR) radiation.

As used herein, "plant" or "plants" can be used interchangeably with the term "crops" which refers to grains, such as rice, wheat, barley, oats, soy beans, rye, spelt, corn, millet, sorghum, buckwheat, chia, quinoa, chickpeas, lentils, lima beans, peanuts, rapeseed, flax seed, and the like. Plant further refers to non-edible plants, for example, flowers, hay and the like.

The feature or features of one embodiment may be applied to other embodiments, even though not described or illustrated, unless expressly prohibited by this disclosure or the nature of the embodiments.

Details associated with the embodiments described above and others are described below.

Disclosed herein are composites, comprising:
a) one or more of the disclosed nanophosphors; and
b) a substrate;
wherein the nanophosphors are situated within the substrate.

In one aspect the disclosed composites, comprise:

a) a visible light enhancing composition, comprising:
   i) a first nanophosphor that emits visible light in the range of from about 520 nm to about 700 nm when exposed to UV radiation; and
   ii) a second nanophosphor that emits visible light in the range of from about 400 to about 520 nm when exposed to UV radiation; and
b) a substrate The disclosed composite materials provide a source of strong white light that can be used for solid-state lighting, full color displays, and as a light source for plant growth, crop improvement and interior lighting. The disclosed materials can have any form chosen by the formulator, for example, films, transparent solid shapes, semi-transparent solid shapes, or a transparent shaped-solid that has one or more reflective surfaces on the inside of the material or on portions of the outside surface.

In one aspect the disclosed composite material is a film. In another aspect the composite material is in the form of a transparent solid. In a further aspect the disclosed composite material is in the form of a semi-transparent solid. Each of these aspects is capable of converting sources of electromagnetic radiation in the ultraviolet range, or above, into electromagnetic radiation in the visible range (i.e., visible light). This ability applies to either natural sources, i.e., direct sunlight, or artificial ultraviolet sources.

Graphitic-phase nitrogen carbon is a stable allotrope under ambient conditions. $g$-$C_3N_4$ is abundant and can be readily obtained via a one-step polymerization of a variety of precursors, non-limiting examples include cyanamide, urea, thiourea, melamine, and dicyandiamide. The band gap of $g$-$C_3N_4$ is 2.7 eV as estimated from absorption spectrum and it decreases as the condensation temperature increases.

For the purposes of the present disclosure, visible light is divided into an upper visible light range (400-520 nm) range and a lower visible light range (520-700 nm). One aspect of the disclosure comprises at least two compounds that when excited by X-ray or UV light produces visible light in both the upper range and lower range. In certain aspects, however, the composite is only be required to emit light in either the upper of lower range.

In one aspect disclosed are visible light enhancing compositions, comprising:
   i) a first nanophosphor that emits visible light in the range of from about 520 nm to about 700 nm when exposed to UV radiation; and
   ii) a second nanophosphor that emits visible light in the range of from about 400 nm to about 520 nm when exposed to UV radiation;
   thereby providing an enhancement in the amount of visible light.

In a further aspect disclosed herein are compositions, comprising a nanophosphor that emits visible light in the range of from about 520 nm to about 700 nm when exposed to UV radiation.

In another aspect disclosed herein are compositions, comprising a nanophosphor that emits visible light in the range of from about 400 nm to about 520 nm when exposed to UV radiation.

The disclosed compositions comprise nanophosphors that are in the form of nanoparticles. As used herein, the term "nanophosphor" means a substance that exhibits the phenomenon of luminescence. The disclosed nanophosphors emit electromagnetic radiation in specific ranges of visible light. Combinations of nanophosphors as disclosed herein, typically do not have emission peaks at the same wavelength, but can have some overlapping wavelengths. The disclosed nanophosphor nanoparticles can optionally comprise one or more rare earth elements.

In one aspect, the disclosed nanophosphor is delaminated graphitic-phase nitrogen carbon ($g$-$C_3N_4$).

In another aspect, the disclosed nanophosphors is copper-cysteamine having the formula $(Cu_3Cl(SCH_2CH_2NH_2)_2$.

In a further aspect the disclosed a visible light enhancing composition, comprise:
   a) delaminated graphitic-phase nitrogen carbon ($g$-$C_3N_4$); and
   b) one or more nanophosphors chosen from copper-cysteamine $(Cu_3Cl(SR)_2$, R is —$CH_2CH_2NH_2$, zinc sulfide (ZnS), silver and manganese doped zinc sulfide (ZnS:Ag, Mn), or activated zinc sulfide (ZnS(Mn)).

In a still further aspect the visible light enhancing compositions, comprise:
   a) delaminated graphitic-phase nitrogen carbon ($g$-$C_3N_4$); and
   b) copper-cysteamine $(Cu_3Cl(SR)_2$, R=$SCH_2CH_2NH_2$;
   wherein the ratio of $g$-$C_3N_4$ to $Cu_3Cl(SCH_2CH_2NH_2)_2$ is from about 1:1 to about 1:5.

In yet further aspect the visible light enhancing compositions, comprise:
   a) delaminated graphitic-phase nitrogen carbon ($g$-$C_3N_4$); and
   b) zinc sulfide (ZnS);
   wherein the ratio of $g$-$C_3N_4$ to ZnS is from about 1:0.5 to about 1:10.

In a yet another aspect the visible light enhancing compositions, comprise:
   a) delaminated graphitic-phase nitrogen carbon ($g$-$C_3N_4$); and
   b) silver and manganese doped zinc sulfide (ZnS:Ag, Mn);
   wherein the ratio of $g$-$C_3N_4$ to ZnS:Ag, Mn is from about 1:0.5 to about 1:10.

In a still yet further aspect the visible light enhancing compositions, comprise:
   a) delaminated graphitic-phase nitrogen carbon ($g$-$C_3N_4$); and
   b) activated zinc sulfide (ZnS(Mn));
   wherein the ratio of $g$-$C_3N_4$ to ZnS(Mn) is from about 1:0.5 to about 1:10.

The disclosed delaminated graphitic-phase nitrogen carbon ($g$-$C_3N_4$) can be delaminated by treatment with a strong mineral acid, for example, nitric acid. By varying the concentration of the acid, the formulator can affect the properties of the final nanophosphors.

Each of the composites described herein above, can further comprise other non-rare earth nanoparticles. One non-limiting example includes which CuS can be added to the composites to reduce heat and protect from infrared radiation damage.

Example 1

1. Preparation of the Disclosed Nanophosphors

Delaminated graphitic-phase nitrogen carbon (g-C3N4) powder was obtained through a low temperature thermal condensation of melamine.[12] Briefly, melamine (2 g) was heated at 500° C. in air for 2 hours with a heating rate of 3° C./min to obtain the desired g-C3N4 as a yellow powder. g-C3N4 (1.5 g) was dispersed in nitric acid solutions (25 mL) having different concentrations of nitric acid; 34.4 wt %, 47.6 wt % and 60.7 wt % respectively. Once combined the solutions were heated at 90° C. while stirring for 2 hours. Then, the solutions were cooled to room temperature and centrifuged to obtain the acid-treated g-C3N4. The solids were washed with deionized water until all trace of acid was removed, then the samples were dried at 70° C. in an air to obtain the desired materials as a white powder.

Example 2

Delaminated $g-C_3N_4$ (30 mg) and Cu—Cy (40 mg) are charged to a 2 mL centrifuge tube and the tube shaken until a complete admixture results. The resulting composition has a ratio of $g-C_3N_4$:Cu—Cy of 1.1.33.

Figure 1A:
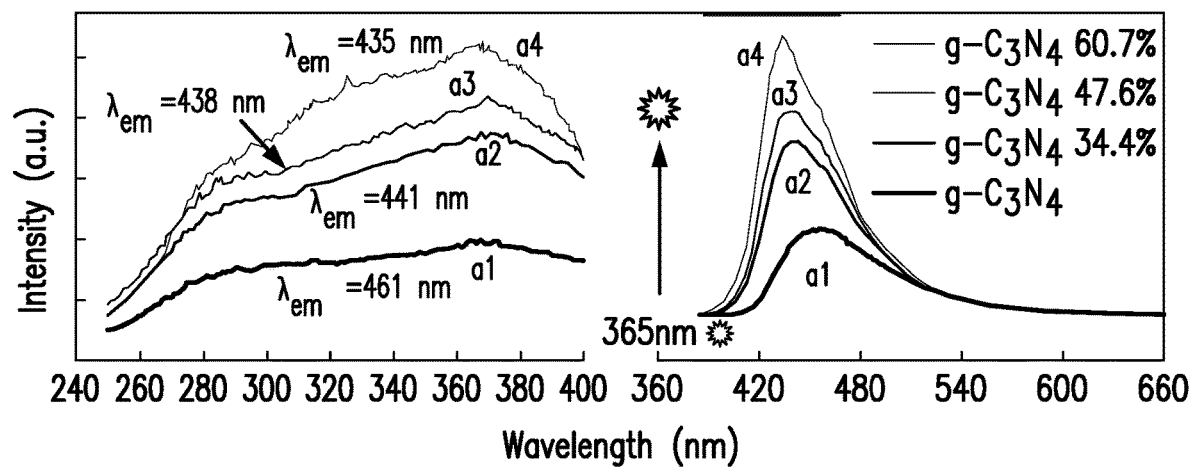
FIG. 1B depicts the emission and excitation spectra for Cu—Cy at room temperature.

FIG. 1A demonstrates the effect of nitric acid concentration on the hypsochromic shift in the spectrum of various delaminated $g-C_3N_4$ samples versus control as described in Example 1. Spectra a1 are the excitation and emission spectra of the control (non-treated $g-C_3N_4$), Spectra b1 are the excitation and emission spectra of $g-C_3N_4$ treated with a 34.4 wt % solution of $HNO_3$, Spectra c1 are the excitation and emission spectra of $g-C_3N_4$ treated with a 47.6 wt % solution of $HNO_3$, and Spectra d1 are the excitation and emission spectra of $g-C_3N_4$ treated with a 60.7 wt % solution of $HNO_3$. As seen in FIG. 1A, the intensity of the excitation and emissions increases with increasing acid concentration. The emission wavelength is also shifted from 461 nm (a1), to 441 nm (b1), to 438 nm (c1) and finally to 435 nm (d 1). All samples where excited at 365 nm.

Figure 1B:
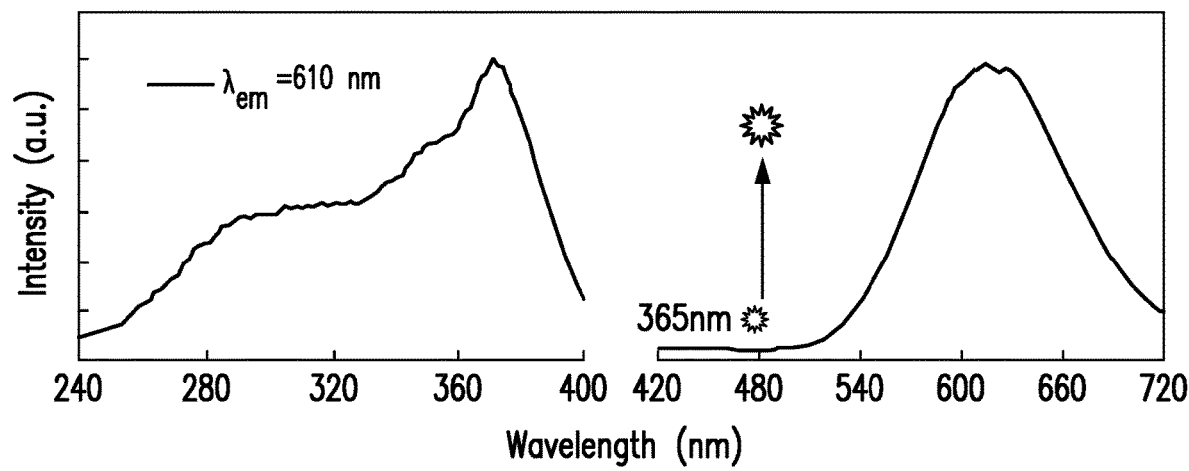
Figure 4A:
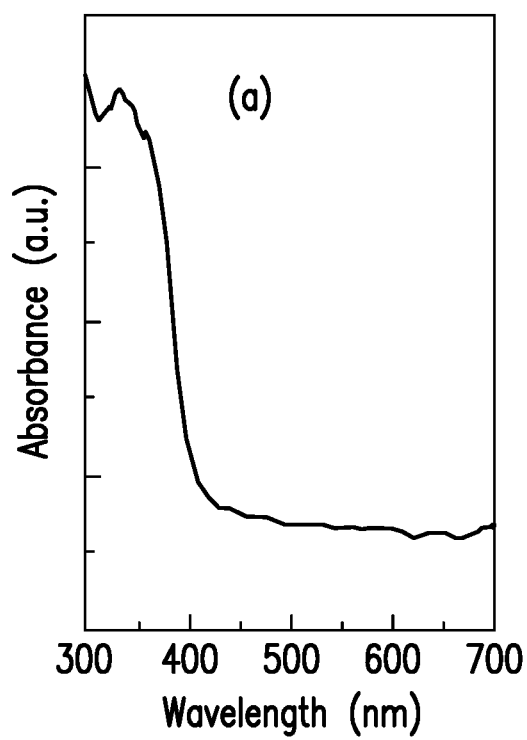
FIG. 4A depicts the absorption spectrum of Cu—Cy.
Figure 4B:
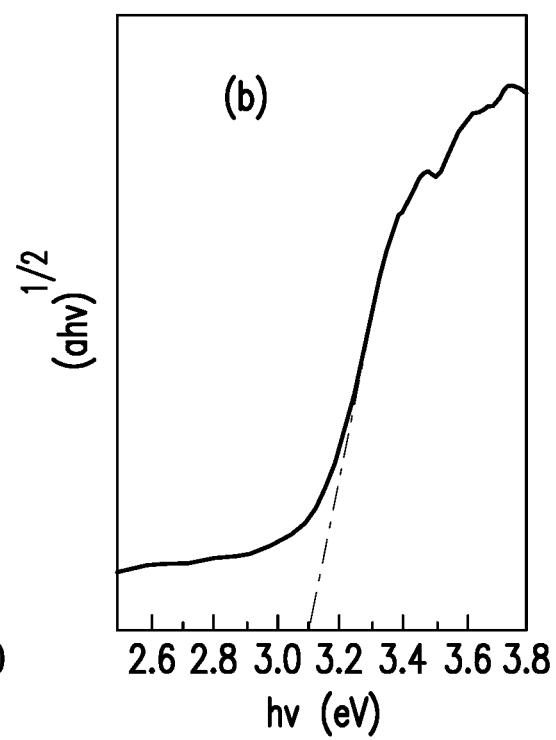
FIG. 4B depicts the corresponding band gap of 3.11 eV due to the sharp absorption edge of Cu—Cy as depicted in FIG. 4A.

FIG. 1B depicts the emission and excitation spectra for Cu—Cy at room temperature. The sample is irradiated at 365 nm, the same as the samples in FIG. 1A, however, the emission occurs at 610 nm. Cu—Cy has a structure in which both the thio and amine group form cysteamine bonded with the copper ions. The Cu—Cy particles include two different Cu atoms-Cu (1) and Cu (2), which bind to 4 and 3 other atoms respectively. The valence analyses from single crystal X-ray diffraction and solid-state nuclear magnetic spectroscopy indicate that they are both $Cu^+$ ions.[11] $g-C_3N_4$ and Cu—Cy have similar excitation spectra, i.e., both have broad excitation band ranging from 250 to 420 nm with a maximum at about 365 nm. This indicates that the two luminescent materials can be activated using a single wavelength excitation. The absorption spectrum of Cu—Cy has a sharp absorption edge at 399 nm that corresponds to a band gap of 3.11 eV (as shown in FIGS. 4A and 4B). $g-C_3N_4$ shows almost no emission below 400 nm as shown in FIG. 1A, i.e., the blue emission of $g-C_3N_4$ is not obviously overlapped with the absorption of Cu-Cy, therefore, no reabsorption or energy transfer occurs between the two materials. Therefore, a composite comprising the $g-C_3N_4$ nanophosphors and Cu—Cy would produce two separate emission peaks.

Figure 2:
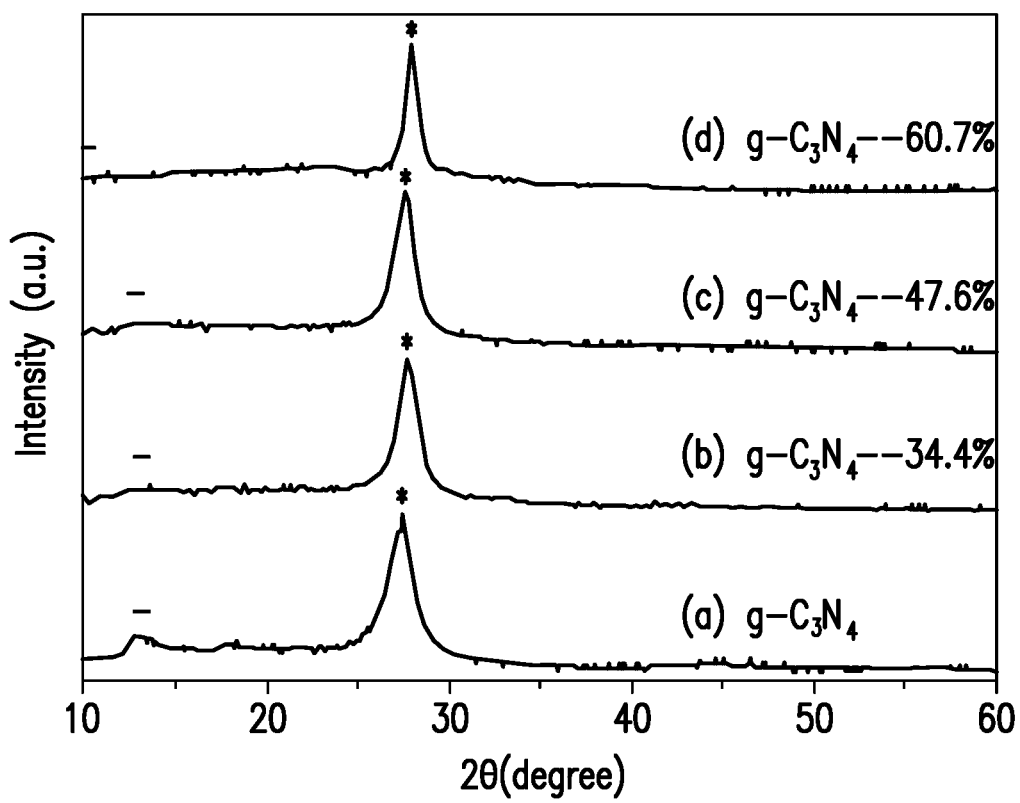
FIG. 2 depicts the XRD patterns of the $g-C_3N_4$ synthesized at 500° C. and $g-C_3N_4$ treated with nitric acids of different concentrations.

FIG. 2 depicts the change in crystal structure of the samples depicted in FIG. 1A. The XRD pattern of $g-C_3N_4$ synthesized at 500° C. exhibits two peaks. The intense peak at 27.4° is associated with an interlayer distance d=0.326 nm and is indexed for graphitic-phase nitrogen carbon as the (002) plane. This peak represents the characteristic interplanar stacking of aromatic systems.[5] The weak diffraction peak at 13.1° corresponds to the in-plane structural packing motif indexed as the (100) plane.[6] Treatment with nitric acid afffects the peak at 13° which is gradually reduced and finally disappears in spectrum (d), while the peak at 27.4° shifts to 27.9°.

Figure 3A:
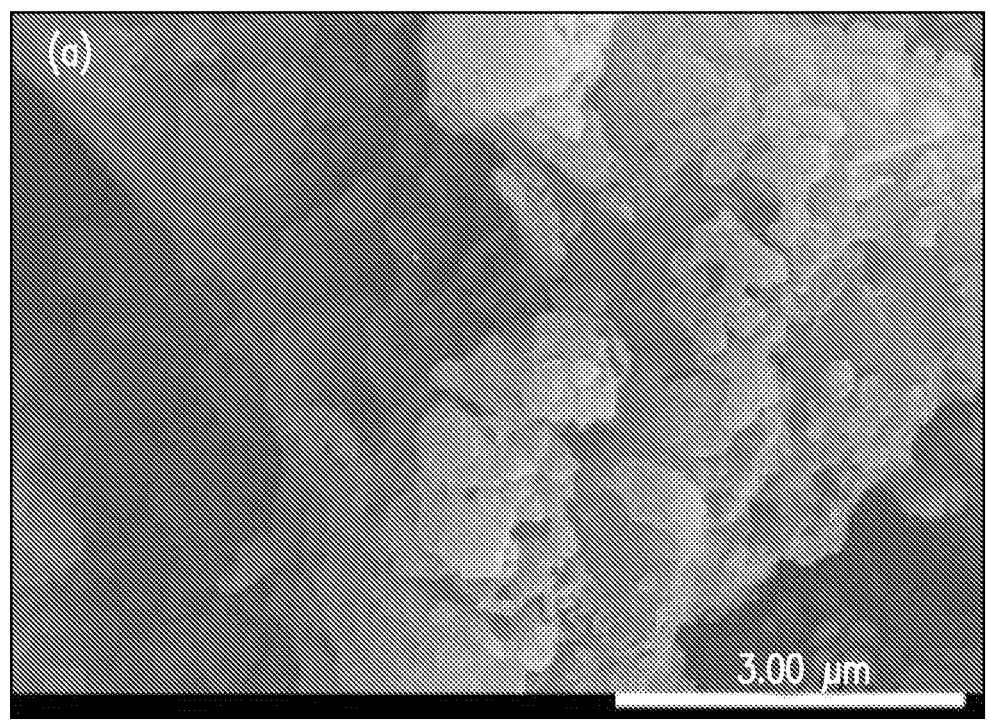
FIG. 3A and FIG. 3B show SEM images of $g-C_3N_4$ prior to acid treatment.
Figure 3B:
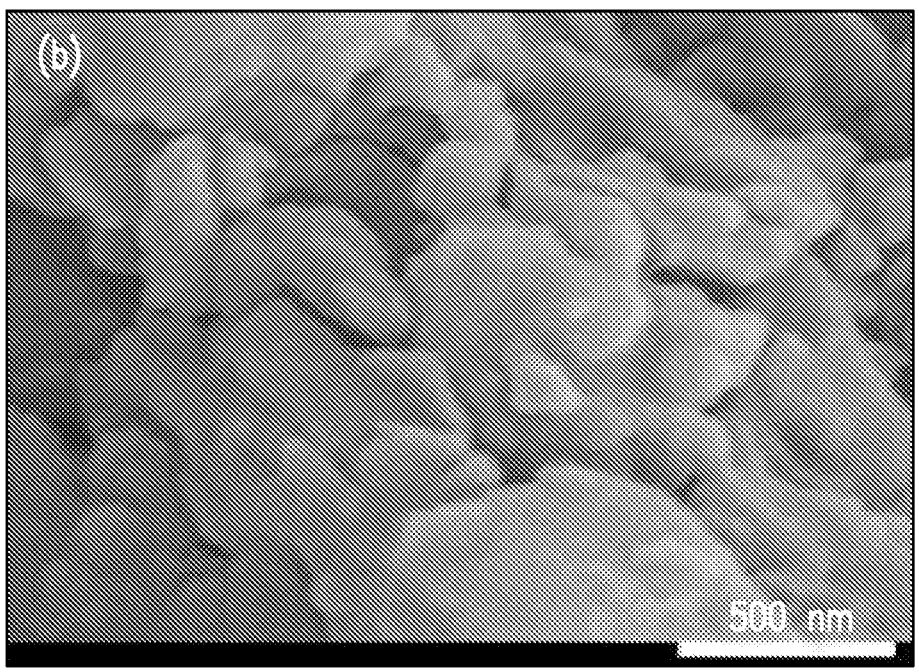
Figure 3C:
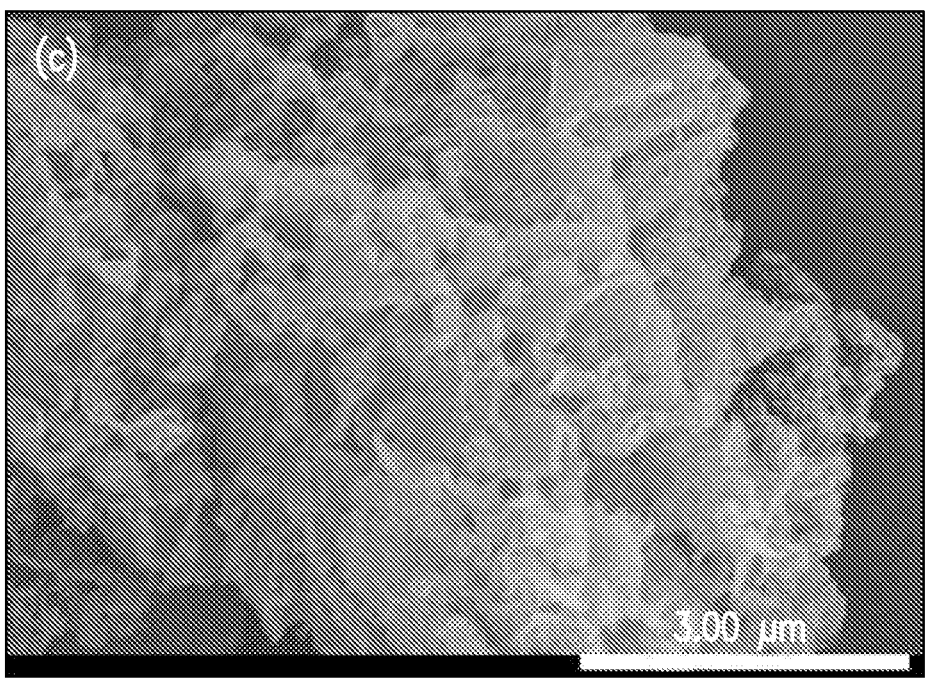
FIG. 3C and FIG. 3D show SEM images of $g-C_3N_4$ depicting delamination, which occurred after the treatment with 60.7% nitric acid.
Figure 3D:
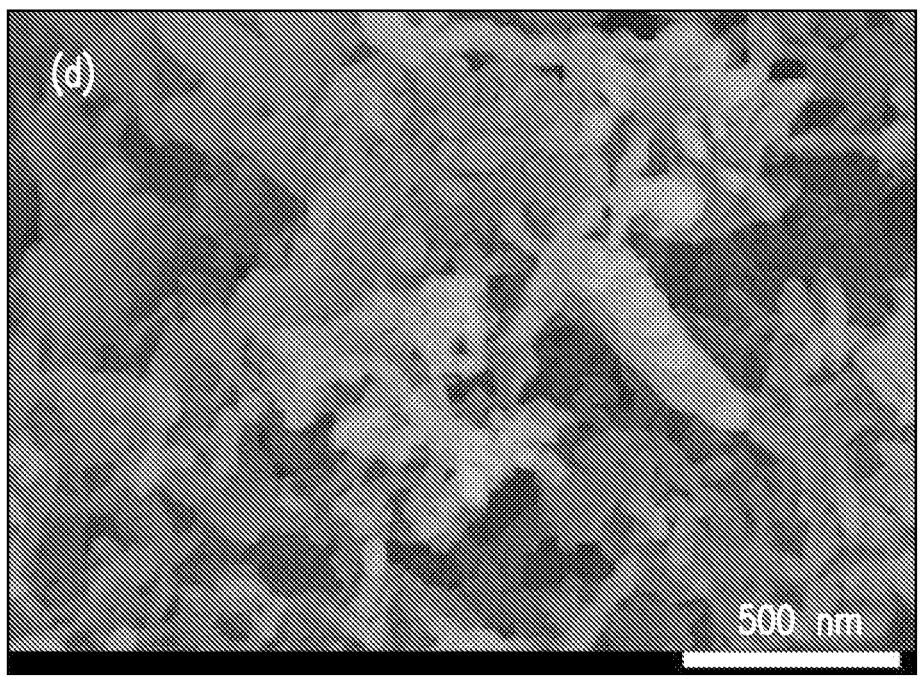
Figure 3E:
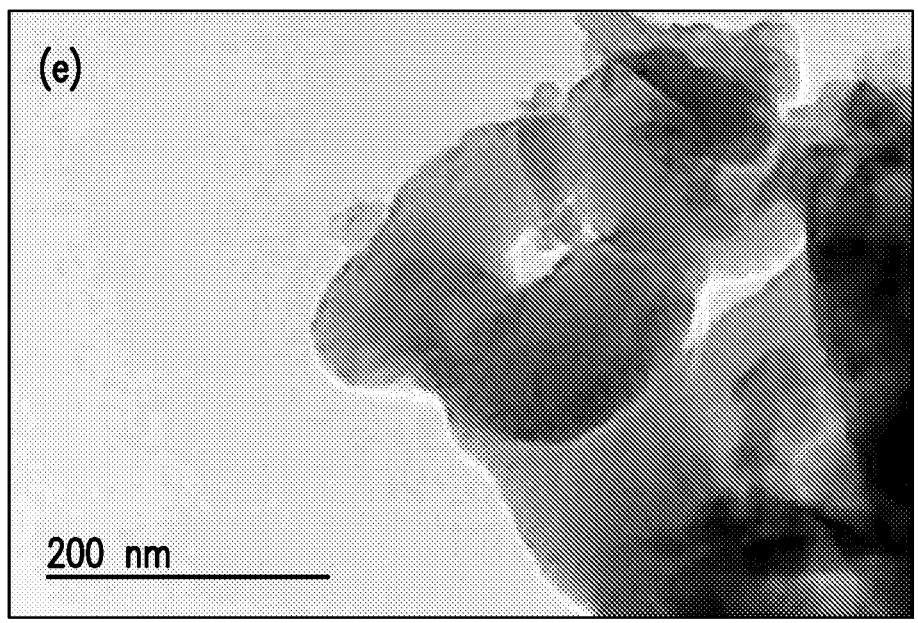
FIG. 3E shows a TEM image of $g-C_3N_4$ prior to acid treatment.
Figure 3F:
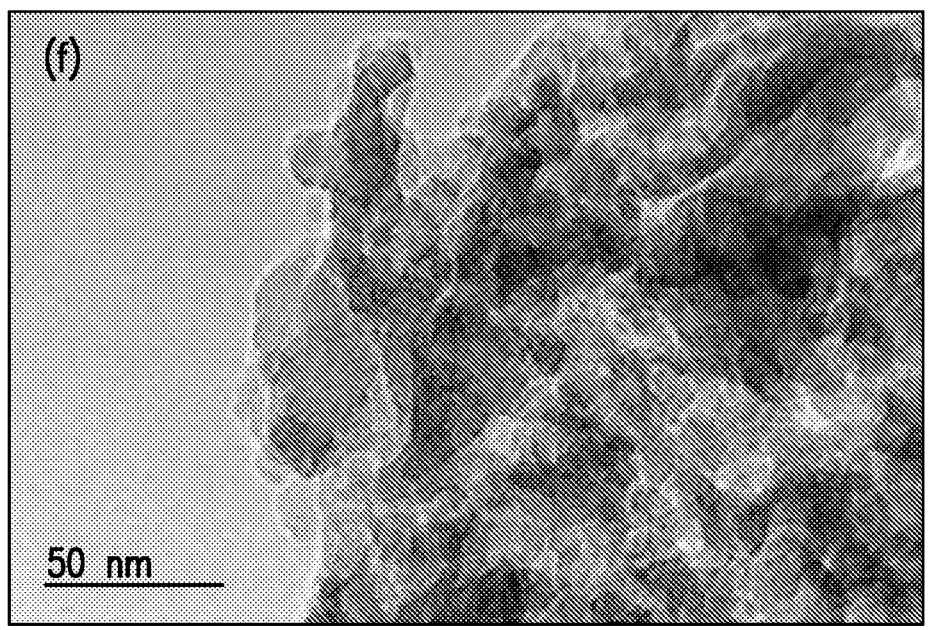
FIG. 3F shows a TEM image of $g-C_3N_4$ depicting delamination, which occurred after treatment with 60.7% nitric acid.

The bulk of the disclosed untreated $g-C_3N_4$ are composed of small particles having a size of about 200 nm as shown by the SEM images in FIG. 3A and FIG. 3B, as well as the TEM image in FIG. 3E. After nitric acid treatment, some $g-C_3N_4$ was delaminated as shown by the SEM image in FIG. 3C. The layer-like powders contain smaller particles, and some are as small as 15 nm as seen in FIG. 3D and FIG. 3F.

Without wishing to be limited by theory, the decrease in the particle size accounts for the gradual weakening and the disappearance of the low-angle reflection peak at 13° as a consequence of the destruction in the long-range order of the in-plane structural packing.[7, 8, 9] The delamination of the bulk materials causes the shift of the peak at 27° because of the shrinking of the distance between the sheets. The single layers in bulk $g-C_3N_4$ are potentially undulated, but can be planarized by heating using nitric acid, resulting in a denser stacking.[7, 9] The calculated density of states (DOS) of single-layered $g-C_3N_4$ nanosheets shows an increase of DOS at the conduction band edge with respect to the bulk counterpart, indicating that the $g-C_3N_4$ nanosheets possess more charge carriers.[10] Delamination coupled with the formation of nano-sized particles causes the blue shift of the absorption edge and emission peak due to quantum size effect. As the nitric acid concentration is increasing, there are more delaminations and formed nanoparticles, therefore, the emission spectrum indicates a continuous blue-shift and the emission intensity is gradually enhanced.

Figure 5:
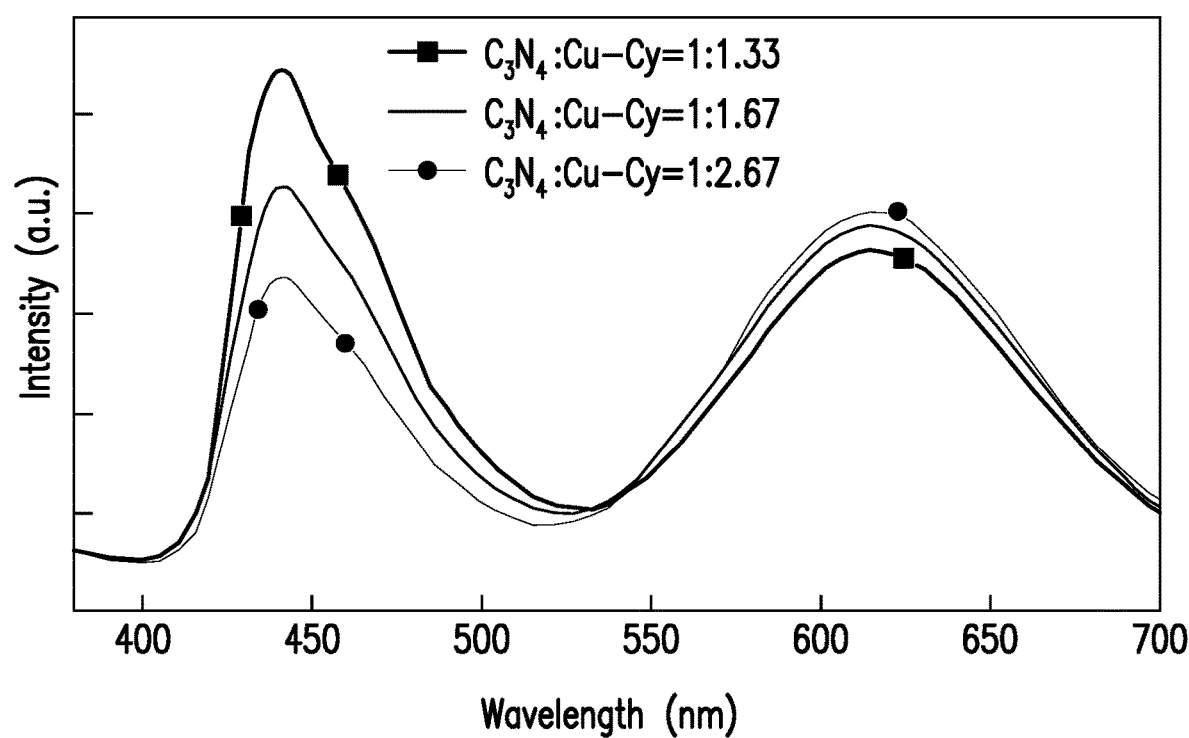
FIG. 5 and FIG. 6 depict the emission spectra and CIE (Commission International de L'Eclairage) chromaticity positions of the phosphors made of different mass ratios of the 60.7% nitric acid treated $g-C_3N_4$ and Cu—Cy.

FIG. 5 displays the emission spectra and CIE (Commission Internationale de L'Eclairage) chromaticity positions of the disclosed nanophosphors, i.e., delaminated $g-C_3N_4$ treated with the 60.7% nitric acid treatment, Cu—Cy, and nanophosphors comprising $g-C_3N_4$ and Cu—Cy having the $g-C_3N_4$ to Cu—Cy weight ratios listed in Table I below. Under excitation at 365 nm, the emission extends through the whole visible light region from 400 to 700 nm. The two strong emission peaks at 435 nm (blue) and 610 nm (orange) are from the emissions of $g-C_3N_4$ and Cu—Cy, respectively. The emission spectrum of the composites is a mechanical mixture of their respective emission spectrum, and the luminescent intensity of the component material increases with its ratio in the mixture. FIG. 6 shows the CIE chromaticity positions of the emission-tunable nanophosphors excited at 365 nm. The inset is a digital photo of the mixed nanophosphors excited by a 365 nm UV lamp. As shown in Table I is the fact that the color coordinates can be gradually tuned from blue (0.156, 0.083) through white-light (0.365, 0.265) toward orange (0.533, 0.409) in the visible spectral region via a systematic changing of the weight ratio of $g-C_3N_4$ and Cu—Cy. When the weight ratio of $g-C_3N_4$ and Cu—Cy is 1:1.67, the quantum yield (QY) is 20%.

TABLE I

| Composition | mass ratio | CIE x | CIE y |
|---|---|---|---|
| $g-C_3N_4$ | | 0.156 | 0.083 |
| $g-C_3N_4$:Cu—Cy | 1:1.33 | 0.336 | 0.238 |
| $g-C_3N_4$:Cu—Cy | 1:1.67 | 0.365 | 0.265 |
| g-C3N4:Cu—Cy | 1:2.67 | 0.393 | 0.287 |
| Cu—Cy | | 0.533 | 0.409 |

Other materials can be combined with delaminated $g-C_3N_4$ to form the disclosed nanophosphors, non-limiting examples of which include cysteamine ($HSCH_2CH_2NH_2$), zinc oxide (ZnO), zinc sulfide (ZnS), silver-activated zinc sulfide (ZnS(Ag)), and manganese-activated zinc sulfide (ZnS:Mn) either in conjunction with Cu—Cy or separately.

An example of a silver and manganese-activated zinc sulfide (ZnS:Ag,Mn) is shown in FIGS. 8A and 8B. In FIG. 8A the composite is shown under white light and FIG. 8B shows the composite under a 360 nm UV lamp. The emissions of this composite by 360 nm UV light can be seen in FIG. 11, ~450 nm (blue) and ~600 nm (orange) wavelengths.

2. Preparation of Composites

As disclosed herein above, the composites which comprise the disclosed nanophosphors can convert UV radiation from an artificial or natural source into electromagnetic radiation in the visible range. Light efficiency for photosynthesis and interior light can be boosted by the use of a transparent or semi-transparent film wherein the disclosed phosphors are embedded therein. The film can comprise any polymer or polymer-like material, non-limiting examples of which include polyethylene, polyester, polystyrene, polyvinyl chloride, poly(methyl methacrylate), etc. The film can be placed on or sandwiched between other transparent materials. In addition to loading transparent polymer films the composites may be directly embedded into transparent materials for use in sunlight conversion.

Example 3

The nanoparticle phosphors are synthesized in water using 3-mercaptopropanoic acid (MPA) as a surfactant (0.5 mm cadmium chloride is dissolved in water (50 mL) followed by the addition of 1004 3-MPA). The pH of the solution is adjusted to 10 by NaOH. Thiourea (0.5 mmol) in water (10 mL) was added and the solution refluxed at 90° C. for 4 hours. The solvent was reduced by evaporation and the precipitated material are washed with a water-acetone mixture and re-dispersed in 20 mL water. Transfer of the highly water dispersible nanoparticles into chloroform is accomplished by replacing 3-MPA with hexadecyl-p-vinylbenzyldimethylammonium chloride (HVDAC). The required amount of HVDAC is dissolved in chloroform (10 mL) followed by addition of the aqueous solution of the nanoparticles (20 mL). After 10 minutes of incubation, the chloroform phase is separated from the aqueous phase using a separating funnel, and nanoparticles are isolated by evaporation of the chloroform.

The nanoparticles are combined with styrene in the desired amount after which an organic peroxide is added. The resulting admixture is sintered at 70° C. for 72 hours to provide a transparent film comprising the disclosed nanophosphors. The resulting polymeric film can be further processed by any conventional means.

For example, the nanophosphor/styrene admixture was heated and homogenized in an extruder screw until molten and evenly mixed. The admixture melt is forced through a flat extrusion die that presses the melt into the desired film shape. The thickness and strength of the film can further be affected by elongation rollers while the materials are still hot and pliable. The extruded film is then cooled, cut and packaged. The film transparency and luminescence properties as well as mechanical strength can be optimized by adjusting the particle loading concentration, size and surface coating.

Any monomer which results in a polymeric substrate that is capable of retaining the disclosed nanophosphors and allowing transmission of the emitted electromagnetic radiation is suitable for use. In addition to polystyrene, the following are non-limiting examples of suitable polymer for us as substrates: polyethylene, polyester, polyvinyl chloride, polystyrene, poly(methyl methacrylate), and the like.

In one aspect the composites are transparent. In one embodiment the nanophosphors are aligned along a first surface of a transparent substrate. In another embodiment the nanophosphors are aligned along a second transparent surface, and the first surface comprises a semi-transparent surface. In a further embodiment the nanophosphors are in the interior of the substrate. In one embodiment the first surface is transparent and captures natural or artificial UV radiation and the composite is configured such that the emitted enhanced visible light passes through the second semi-transparent surface to produce a muted glow.

In addition to the formation of a single transparent film comprising the disclosed nanophosphors, the nanophosphors can be embedded or supported by other transparent or semi-transparent substrates. Alternatively the nanophosphor embedded composites can be formed into geometric shapes. As such, all of the final polymeric composites can have a greater or lesser degree of flexibility depending upon the choice of the type of polymer, the amount of polymer, the configuration of the composite, as well as the concentration of nanophosphor. Non-limiting matrices that can substitute for polymers includes glass, transparent ceramic and transparent aluminum.

In one embodiment, the composites can comprise other electromagnetic property modulating materials. For example, CuS can be added to the nanophosphor/polymer admixture as a protectant against infrared damage.

In one aspect the disclosed composites can be used to form white light-emitting diodes. FIG. 7 shows the electroluminescence spectrum of a WLED (white light-emitting Diode) lamp, fabricated by deposition of g-$C_3N_4$ and Cu—Cy (weight ratio 1:1.67) on a 365 nm NUV (near ultraviolet) LED chip. The WLED has a broad blue emission at 435 nm from g-$C_3N_4$ and a broad red emission at 610 nm attributed to Cu—Cy (FIG. 7). The inset of FIG. 7 shows a single-composition WLED lamp and its white-light emission driven under a forward bias current of 300 mA. The detailed CIE color coordinates, CCT (correlated color temperature) and CRI (color rendering index) of the WLED lamp under forward bias of 300 mA are: x=0.352, y=0.320, 4523 K and 94.3, respectively. The luminescence intensity of the WLED increases when the bias current is from 100 mA to 150 mA.

In another aspect the disclosed composites can be fabricated into devices, including lamps, sheets, coverings and the like which can be configured with crops to provided enhance visible light. The enhanced visible light serves as a means for enhancing the photosynthesis of the treated crops.

Disclosed herein is a method for preparing delaminated graphitic-phase nitrogen carbon (g-$C_3N_4$), comprising:
 (a) dispersing from about 2% to about 10% weight/volume of g-$C_3N_4$ into a nitric acid solution;
 (b) heating the dispersion; and
 (c) isolating the delaminated g-$C_3N_4$.

In one aspect the nitric acid solution contains from about 30% to about 70% by weight nitric acid. Therefore, the nitric acid solution can contain 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69% or 70% by weight nitric acid.

In another aspect the amount of g-$C_3N_4$ dispersed into the nitric acid solution in step (a) is from about 2% to about 5% w/v.

In a further aspect the amount of g-$C_3N_4$ dispersed into the nitric acid solution in step (a) is from about 5% to about 10% w/v.

In a still further aspect the amount of g-$C_3N_4$ dispersed into the nitric acid solution in step (a) is from about 3% to about 8% w/v.

In another aspect the amount of g-$C_3N_4$ dispersed into the nitric acid solution in step (a) is from about 4% to about 6% w/v. The amount of g-$C_3N_4$ dispersed into the nitric acid solution can be 2% w/v, 3% w/v, 4% w/v, 5% w/v, 6% w/v, 7% w/v, 8% w/v, 9% w/v, or 10% w/v.

In a still further aspect the dispersion is heat at temperature from about 80° C. to about 100° C. The dispersion can be heated to 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., or 100° C.

The delaminated g-$C_3N_4$ can be isolated before cooling or after cooling. The delaminated g-$C_3N_4$ can be isolated by any means chosen by the formulator. In one embodiment the cooled dispersion is centrifuged to concentrate the g-$C_3N_4$ followed by washing with water until the nitric acid is removed followed by air drying.

The claims are not intended to include, and should not be interpreted to include, means-plus- or step-plus-function limitations, unless such a limitation is explicitly recited in a given claim using the phrase(s) "means for" or "step for," respectively.

Methods

Disclosed herein are methods for utilizing the disclosed composites. In one aspect the composites provide methods for increasing the amount of visible light present when a natural or artificial source of electromagnetic radiation impinges upon the composite. In one embodiment the composite can comprise a visible light enhancing composition comprising one or more of the disclosed nanophosphors and a substrate. In one iteration the nanophosphors are deposited within a transparent substrate. In one example, the transparent substrate is the window of a structure receiving natural light from outside. In another example, the window is an opening between rooms wherein natural light and/or artificial light impinges upon the substrate thereby providing increased visible light.

In another embodiment the composite can comprise a visible light enhancing composition comprising one or more of the disclosed nanophosphors and a substrate wherein one surface is a reflecting surface that reflects electromagnetic radiation inward. In this embodiment radiation travels through the substrate and is reflected outward toward the source. This provides a means for enhancing the incoming, as well as the reflected radiation.

Disclosed herein is a method for providing solid state lighting having enhanced visible light, comprising:
A) exposing a composite, comprising:
  a) a visible light enhancing composition, comprising:
    i) a first nanophosphor that emits visible light in the range of from about 520 nm to about 700 nm when exposed to UV radiation; and
    ii) a second nanophosphor that emits visible light in the range of from about 400 to about 520 nm when exposed to UV radiation; and
  b) a substrate;
B) to a source of electromagnetic radiation;
wherein the electromagnetic radiation impinges upon the composite thereby increasing the amount of electromagnetic radiation in the visible range.

Also disclosed are methods for enhancing the growth of one or more plants. In a manner like the method disclosed above, the composite can be a large sheet of plastic, transparent, translucent, or otherwise allowing the transmission of visible light, which is place over growing plants. One use is to provide a covering over plants that would get reduced lighting due to the natural climate conditions or due to the reduced light due to seasonal lighting change.

In another aspect disclose herein is a method for detecting radiation, comprising:
A) exposing an article of manufacture, comprising:
  a) a composite, comprising:
    i) a first nanophosphor that emits visible light in the range of from about 520 nm to about 700 nm when exposed to UV radiation; and
    ii) a second nanophosphor that emits visible light in the range of from about 400 to about 520 nm when exposed to UV radiation; and
  b) a substrate;
B) to a source of radiation; and
C) detecting the increased amount of visible light present.

Radiation from a high energy source can be converted to radiation at longer wavelengths depending upon the selection and the concentration of nanophosphors. For example, the composite can have several layers of nanophophers that capture and re-emit the electromagnetic radiation to be captured again and re-emitted at an even longer wavelength. Embodiments can be used to capture and detect X-rays and gamma-ray emissions. In a further embodiment a plurality of composites can be spaced apart wherein each composite comprises different nanophosphors. In one example, a vacuum is created between the layers to facilitate transmission of the re-emitted radiation onto the next layer.

Further disclosed herein are methods for the preparation of delaminated graphitic-phase nitrogen carbon (g-$C_3N_4$), comprising:
(a) dispersing from about 2% to about 10% weight/volume of g-$C_3N_4$ into a nitric acid solution;
(b) heating the dispersion; and
(c) isolating the delaminated g-$C_3N_4$.

The amount of g-$C_3N_4$ utilized in step (a) can range from about 2% to about 10% w/v. The formulator, however, can utilize any amounts in this range, for example, 2%, 3%, 4%, 5%, 6%, 7%, 8%, 9% or 10%.

In addition, the dispersion can be heated to any temperature from about 80° C. to about 100° C. The formulator, however, can utilize any temperature in this range, for example, 80° C., 81° C., 82° C., 83° C., 84° C., 85° C., 86° C., 87° C., 88° C., 89° C., 90° C., 91° C., 92° C., 93° C., 94° C., 94° C., 96° C., 97° C., 98° C., 99° C., or 100° C.

In addition, the formulator can use any concentration of nitric acid in step (a) about 30% to about 70% by weight. The formulator, however, can use any concentration in this range, for example, 30%, 31%, 32 m, 33%, 34%, 35%, 36%, 37%, 38%, 39%, 40%, 41%, 42 m, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, or 70%.

The delaminated g-$C_3N_4$ can be isolated by any means convenient to the formulator, for example, filtration, extraction, centrifugation and the like.

The present disclosure provides a description of the structure and use of non-limiting illustrative embodiments. Although certain embodiments have been described with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

REFERENCES

The following references, to the extent that they provide exemplary procedural or other details supplementary to those set forth above, are specifically incorporated by reference.

[1] Zhu X-G, Long S P, Ort D R. Annu Revi Plant Biol 2010; 61:235-261.
[2] Zhu X-G, Long S P, Ort D R. Current Opinion in Biotechnology 2008; 19:153-159.
[3] Peng S B, Tang Q, Zou Y. Plant Prod Sci 2009; 12:3-8.
[4] Wiebe K, editor. The State of Food and Agriculture 2008. Biofuels: Prospects, Risks and Opportunities; 2008.
[5] J. Xu, Y. Li, S. Peng, G. Lu, S. Li, Phys. Chem. Chem. Phys. 2013, 15, 7657.
[6] J. Zhou, Y. Yang, C. Y. Zhang, Chem. Commun. 2013, 49, 8605.
[7] M. Groenewolt, M. Antonietti, Adv. Mater. 2005, 17, 1789.
[8] P Niu, G Liu, H M Cheng, J. Phys. Chem. C 2012, 116, 11013
[9] P Niu, L. L. Zhang, G. Liu, H. M. Cheng, Adv. Funct. Mater. 2012, 22, 476
[10] X. D. Zhang, X. X, H. Wang, J. J. Zhang, B. C. Pan, Y. Xie, J. Am. Chem. Soc. 2013, 135, 18.
[11] L. Ma, W. Chen, G. Schatte, W. Wang, A. G. Joly, Y. Huang, R. Sammynaiken, M. Hossu, J. Mat. Chem. C. 2014, 2, 4239.
[12] Y. Zhang, Q. Pan, G. Chai, M. Liang, G. Dong, Q. Zhang, J. Qiu, Sci. Rep. 2013, 3, 1943.
[13] E. Fred Schubert, J. K. Kim, Science 2005, 308, 1274
[14] S. B. Kim, B. G. Kum, H. M. Jang, A. Lakshmanan, B. K. Kang, J. Lumin. 2011, 131, 1625.
[15] Y. L. Huang, Y. M. Yu, T. Tsebin, H. J. See, Opt. Express 2012, 20, 4360
[16] J. K. Kim, H. Luo, E. F. Schubert, J. Cho, C. Sone, Y. Park, Jon. J. Appl. Phys. 2005, 44, L649.
[17] S. E. Brinkley, N. Pfaff, K. A. Default, Z. J. Zhang, H. T. Hint Zen, R. Sephardi, S. Nakamura, S. P. Debars, Appl. Phys. Lett. 2011, 99, 241106.

What is claimed is:

1. A composite, comprising:
    a) a visible light enhancing composition, comprising:
        i) a first nanophosphor that emits visible light in the range of from about 520 nm to about 700 nm when exposed to UV radiation chosen from copper-cystamine, ZnS:Ag,Mn or ZnS:Mn; and
        ii) delaminated graphitic-phase nitrogen carbon (g-$C_3N_4$) and a second nanophosphor that emits visible light in the range of from about 400 to about 520 nm when exposed to UV radiation chosen from ZnS, ZnO or ZnS:Ag; and
    b) a substrate.

2. The composite according to claim 1, wherein the nanophosphor is copper-cysteamine.

3. The composite according to claim 1, wherein the nanophosphor is ZnS.

4. The composite according to claim 1, wherein the nanophosphor is ZnS:Ag, Mn.

5. The composite according to claim 1, wherein the nanophosphor is ZnS:Mn ZnS(Mn).

6. The composite according to claim 1, wherein the substrate is a polymer.

7. The composite according to claim 6, wherein the substrate is a polymer chosen from polystyrene, polyethylene, polyester, polyvinyl chloride, or poly(methyl methacrylate).

8. The composite according to claim 1, wherein the substrate is transparent.

9. The composite according to claim 1, wherein the substrate is semi-transparent.

10. The composite according to claim 1, wherein the substrate has a first transparent surface and a second semi-transparent surface.

11. The composite according to claim 1, wherein the substrate is in the form of a film.

12. The composite according to claim 1, wherein the substrate is in the form of a geometric shape.

13. A method for providing solid state lighting having enhanced visible light, comprising:
    A) exposing a composite, comprising:
        a) a visible light enhancing composition, comprising:
            i) a first nanophosphor that emits visible light in the range of from about 520 nm to about 700 nm when exposed to UV radiation chosen from copper-cystamine, ZnS:Ag,Mn or ZnS:Mn; and
            ii) delaminated graphitic-phase nitrogen carbon (g-$C_3N_4$) and a second nanophosphor that emits visible light in the range of from about 400 to about 520 nm when exposed to UV radiation chosen from ZnS, ZnO or ZnS:Ag; and
        b) a substrate;
    B) to a source of electromagnetic radiation;
    wherein the electromagnetic radiation impinges upon the composite thereby increasing the amount of electromagnetic radiation in the visible range.

* * * * *